US010668366B2

(12) United States Patent
Fu

(10) Patent No.: US 10,668,366 B2
(45) Date of Patent: Jun. 2, 2020

(54) INFORMATION PROCESSING METHOD AND SMART CUBE

(71) Applicant: Beijing Xiaomi Mobile Software Co., Ltd., Beijing (CN)

(72) Inventor: Qiang Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 72 days.

(21) Appl. No.: 15/954,697

(22) Filed: Apr. 17, 2018

(65) Prior Publication Data
US 2019/0091559 A1 Mar. 28, 2019

(30) Foreign Application Priority Data

Sep. 27, 2017 (CN) .......................... 2017 1 0887987

(51) Int. Cl.
*A63F 9/08* (2006.01)
*A63F 3/04* (2006.01)
(Continued)

(52) U.S. Cl.
CPC .......... *A63F 3/0421* (2013.01); *A63F 9/0842* (2013.01); *A63F 13/2145* (2014.09);
(Continued)

(58) Field of Classification Search
CPC ...... A63F 2009/2402; A63F 2009/2457; A63F 2009/2458; A63F 9/06; A63F 9/0612; A63F 9/08; A63F 9/0826
See application file for complete search history.

(56) References Cited

U.S. PATENT DOCUMENTS 7,862,415 B1 * 1/2011 Ghaly .................. A63F 9/0613
                                                            463/9
9,111,382 B2 * 8/2015 Ueno ..................... A63F 9/0826
(Continued)

FOREIGN PATENT DOCUMENTS

CN          201765460 U       3/2011
CN          102289338 A      12/2011
(Continued)

OTHER PUBLICATIONS

Extended European Search Report dated Dec. 12, 2018 in Patent Application No. 18174768.4, 12 pages.
(Continued)

*Primary Examiner* — David L Lewis
*Assistant Examiner* — Ross A Williams
(74) *Attorney, Agent, or Firm* — Oblon, McClelland, Maier & Neustadt, L.L.P.

(57) ABSTRACT

The present disclosure relates to an information processing method and a smart cube. The information processing method includes obtaining display information via a smart cube, wherein the smart cube includes a cube block having a plurality of outer surfaces each having at least one of a plurality of display screens, each one of the plurality of display screens is configured to display a piece of display content, the display information is configured to indicate positions of K display tiles and K pieces of display content corresponding to the K display tiles, each one of the K display tiles corresponds to one of the plurality of display screens, and K is smaller than a total number of the display screens on the smart cube; displaying the K pieces of the display content on the K display tiles based on the display information; detecting a turning of the smart cube; determining updated information based on the turning of the smart cube, wherein the updated information is the display
(Continued)

information updated based on the turning of the smart cube; determining whether the display content displayed on at least one of the outer surfaces of the smart cube satisfies a preset condition based on the updated information; and triggering a preset operation when it is determined that the display content displayed on at least one of the outer surfaces of the smart cube satisfies the preset condition based on the updated information.

14 Claims, 16 Drawing Sheets

(51) Int. Cl.
    *G06F 3/0484*     (2013.01)
    *G06F 3/0487*     (2013.01)
    *A63F 13/2145*     (2014.01)
    *A63F 13/24*     (2014.01)
    *A63F 13/92*     (2014.01)
    *G06F 3/03*     (2006.01)
    *A63F 9/24*     (2006.01)

(52) U.S. Cl.
    CPC .............. *A63F 13/24* (2014.09); *A63F 13/92* (2014.09); *G06F 3/03* (2013.01); *G06F 3/0484* (2013.01); *G06F 3/0487* (2013.01); *A63F 2009/2457* (2013.01); *A63F 2300/204* (2013.01); *A63F 2300/208* (2013.01)

(56) References Cited

U.S. PATENT DOCUMENTS

| | | | |
|---|---|---|---|
| 9,696,842 B2 * | 7/2017 | Algreatly | G06F 3/0416 |
| 2008/0070657 A1 * | 3/2008 | Kratz | A63F 9/24 463/9 |
| 2010/0261514 A1 * | 10/2010 | Gramelspacher | A63F 9/0612 463/9 |
| 2018/0311566 A1 * | 11/2018 | Shin | A63F 9/0838 |

FOREIGN PATENT DOCUMENTS

| | | |
|---|---|---|
| CN | 102728052 A | 10/2012 |
| CN | 202615140 U | 12/2012 |
| CN | 104857702 A | 8/2015 |

OTHER PUBLICATIONS

Office Action dated Mar. 12, 2020 in Chinese Application No. 201710887987.7 with partial English translation, 10 pages.

* cited by examiner

INFORMATION PROCESSING METHOD AND SMART CUBE

CROSS REFERENCE TO RELATED APPLICATION

This application is based on and claims priority to Chinese Patent Application Serial No. 201710887987.7, filed on Sep. 27, 2017, the entire contents of which are incorporated herein by reference.

TECHNICAL FIELD

The present disclosure relates to the field of information technology, and more particularly, to an information processing method and a smart cube.

BACKGROUND

In daily life, users are using smart phones more and more frequently. Users mostly manipulate smart phones through buttons or touchscreens. Such a monotonous and repetitive mode of operation is nothing new to the users.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide an information processing method. The method includes obtaining display information via a smart cube, wherein the smart cube includes a cube block having a plurality of outer surfaces each having at least one of a plurality of display screens, each one of the plurality of display screens is configured to display a piece of display content, the display information is configured to indicate positions of K display tiles and K pieces of display content corresponding to the K display tiles, each one of the K display tiles corresponds to one of the plurality of display screens, and K is smaller than a total number of the display screens on the smart cube; displaying the K pieces of the display content on the K display tiles based on the display information; detecting a turning of the smart cube; determining updated information based on the turning of the smart cube, wherein the updated information is the display information updated based on the turning of the smart cube; determining whether the display content displayed on at least one of the outer surfaces of the smart cube satisfies a preset condition based on the updated information; and triggering a preset operation when it is determined that the display content displayed on at least one of the outer surfaces of the smart cube satisfies the preset condition based on the updated information.

According to an aspect, the display content displayed on the outer surface of the smart cube satisfies the preset condition when the display tiles on any one of the outer surfaces of the smart cube comprise L display tiles for displaying predetermined L pieces of the display content, wherein $L \geq 2$ and the L pieces of the display content are included in the K pieces of the display content.

In an example, the K pieces of the display content comprise L instruction trigger identifiers; the L pieces of the display content are the L instruction trigger identifiers; and the triggering a preset operation comprises instructing a target device to perform a control operation bound to the L instruction trigger identifiers.

In another example the K pieces of the display content comprise C candidate trigger conditions and M candidate control operations, and at least one of the C candidate trigger conditions is configured to instruct a target device to trigger at least one of the M candidate control operations, where C+M=K; the L pieces of display content comprise a trigger condition and a control operation; or the L pieces of display content comprise two or more coexisting trigger conditions and the control operation; and triggering the preset operation comprises storing the L pieces of the display content to be applied to control the target device.

According to an aspect, after storing the L pieces of the display content to be applied to control the target device, the method includes instructing the target device to perform a selected control operation when a selected trigger condition is satisfied, wherein the selected trigger condition comprises all of the trigger conditions included in the L pieces of the display content, and the selected control operation is the control operation included in the L pieces of the display content.

In an example, the display content displayed on the outer surface of the smart cube satisfies the preset condition further when the L display tiles are arranged in a predetermined order.

In another example, the K pieces of the display content comprise L image tiles that are arranged on one of the outer surfaces of the smart cube to form a complete image; the L pieces of the display content are the L image tiles; and the L display tiles are arranged in the predetermined order when the L image tiles as displayed by the L display tiles are arranged to form the complete image.

In yet another example, the K pieces of the display content comprise L letters that are arranged on one of the outer surfaces of the smart cube to form at least one word; the L pieces of the display content are the L letters; and the L display tiles are arranged in the predetermined order when the L letters as displayed by the L display tiles are arranged to form the at least one word.

When triggering the preset operation, the method includes obtaining new display information, and generating a display based on the new display information.

Aspects of the disclosure also provide a smart cube that includes a cube block having a plurality of outer surfaces each having at least one of a plurality of display screens, wherein each one of the plurality of display screens is configured to display a piece of display content; a control module configured to obtain display information, wherein the display information is used to indicate positions of K display tiles and K pieces of display content corresponding to the K display tiles, each one of the K display tiles corresponds to one of the plurality of the display screens, and K is smaller than a total number of the display screens on the smart cube; a display module configured to display the K pieces of the display content on the K display tiles based on the display information; a detector configured to detect a turning of the smart cube; an update module configured to determine updated information based on the turning of the smart cube, wherein the updated information is the display information updated based on the turning of the smart cube; a determiner configured to determine whether the display content displayed on at least one of the outer surfaces of the smart cube satisfies a preset condition based on the updated information; and a trigger module configured to trigger a preset operation when it is determined that the display content displayed on at least one of the outer surfaces of the smart cube satisfies the preset condition based on the updated information.

Aspects of the disclosure also provide a smart cube that includes a processor and a memory for storing instructions executable by the processor. The processor is configured to obtain display information, wherein the smart cube includes a cube block having a plurality of outer surfaces each having at least one of a plurality of display screens, each one of the plurality of display screens is configured to display a piece of display content, the display information is configured to indicate positions of K display tiles and K pieces of display content corresponding to the K display tiles, each one of the K display tiles corresponds to one of the plurality of display screens, and K is smaller than a total number of the display screens on the smart cube; display the K pieces of the display content on the K display tiles based on the display information; detect a turning of the smart cube; determine updated information based on the turning of the smart cube, wherein the updated information is the display information updated based on the turning of the smart cube; determine whether the display content displayed on at least one of the outer surfaces of the smart cube satisfies a preset condition based on the updated information; and trigger a preset operation when it is determined that the display content displayed on at least one of the outer surfaces of the smart cube satisfies the preset condition based on the updated information.

Aspects of the disclosure also provide a non-transitory computer-readable storage medium having computer instructions stored thereon, wherein the instructions, when executed by a processor, cause the processor to implement the information processing method.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

Figure 1:
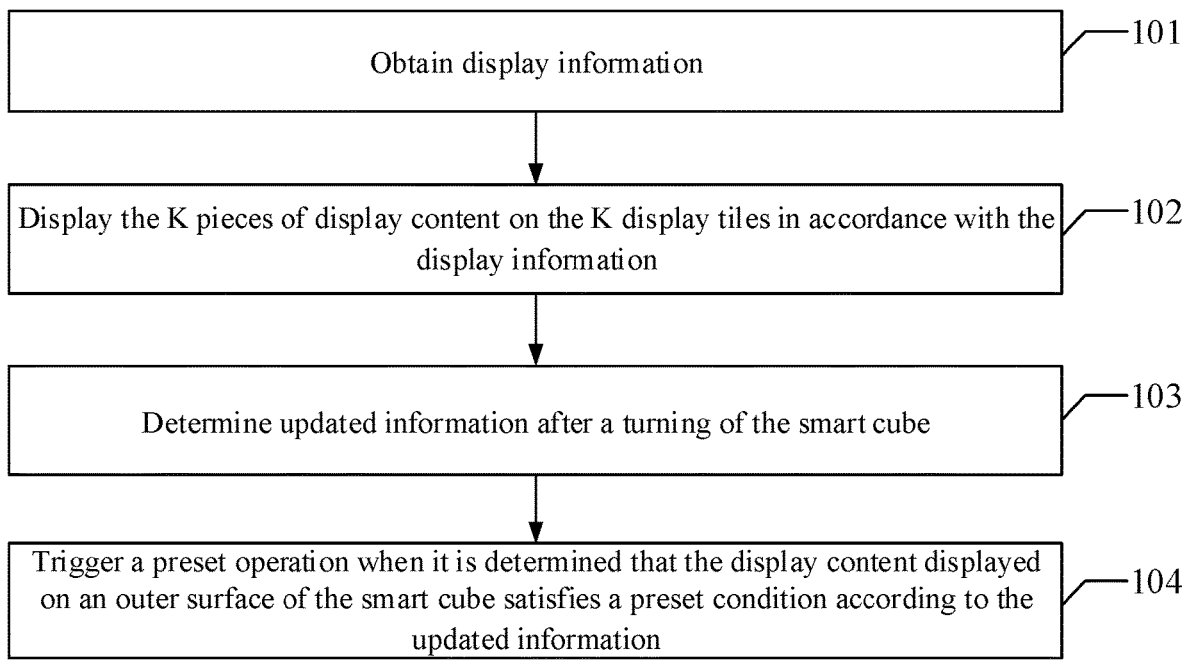
FIG. 1 is a flow chart of an information processing method as illustrated according to an exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which same numbers in different drawings represent same or similar elements unless otherwise described. The implementations set forth in the following description of exemplary aspects do not represent all implementations consistent with the disclosure. Instead, they are merely examples of devices and methods consistent with aspects related to the disclosure as recited in the appended claims.

An information processing method and a smart cube for performing the information processing method are provided in the present disclosure, so as to improve a way of interacting with products.

Each cube block of the smart cube may be provided with a display screen such as a Liquid Crystal Display (LCD) screen, a Light Emitting Diode (LED) screen, an Organic Light Emitting Diode (OLED) screen, or the like on its outer wall.

As an example, assuming the smart cube is a 3×3 cube, there are nine cube blocks on a surface of the smart cube. Each cube block displays an image tile and image tiles displayed on the nine cube blocks form a complete image. Certainly, the display content may have a number of variations, such as numbers, letters and the like. The specific form of the display content will not be limited in the present disclosure.

For the convenience of description, in an aspect of the present disclosure, the content displayed on a display screen may be referred to as a piece of display content, and the display screen for displaying the piece of display content may be referred to as a display tile. All display screens other than the display tile may be left blank or display other content not related to the trigger of current operations, such as display content for triggering another operation, screen-savers, advertisements, or teaching tips for turning the smart cube, etc.

The smart cube may display some out-of-order content in an initial state, and the user may change the display position of the content on the smart cube by turning the smart cube. The turning of the smart cube may be detected by a detector within the smart cube. As far as an outer surface of the smart cube is concerned, as the smart cube turns, the content displayed on the outer surface also changes. When the display content on the outer surface satisfies a preset condition, a certain operation may be triggered. For example, a control instruction may be sent to another device, or a usage scenario about another device may be created to indicate what kind of control operations may be performed when a certain condition is satisfied, or games such as Scrabble or jigsaw puzzles may be played.

In aspects of the present disclosure, several possible operations to be triggered by the smart cube are listed with reference to several specific application scenarios. Of course, the listed operations in the aspects are only used as examples for illustrating functions of the smart cube, rather than exhaustive of the specific functions or application scenarios thereof.

FIG. 1 is a flow chart of an information processing method as illustrated according to an exemplary aspect. The method may be applied to the smart cube and include steps 101 to 104.

At step 101, display information may be obtained.

The display information may be used to indicate positions of K display tiles and K pieces of display content corresponding to the K display tiles. Each display tile may be a display screen for displaying a piece of display content. The display information may be stored in a memory of the smart cube, so that the smart cube may access the display information from the memory when powering up or waking up.

For example, assuming the smart cube is a 3×3 cube, a total number of the display screens on the smart cube may be 54. Six outer surfaces of the 3×3 cube may be represented by A, B, C, D, E, and F respectively. Each outer surface may include nine display screens thereon. As shown in Table 1, the nine display screens on an outer surface of the six outer surfaces may be represented by $A_1$ to $A_9$. The outer surface A is the outer surface A where the display screen $A_5$ is located, and so on.

TABLE 1

| $A_1$ | $A_2$ | $A_3$ |
| $A_4$ | $A_5$ | $A_6$ |
| $A_7$ | $A_8$ | $A_9$ |

K is smaller than the total number of the display screen on the smart cube. For example, in the case of K=2, the display information may be used to indicate: a piece of display content may be displayed on each of the display screens $A_5$ and $B_2$. In an aspect, the piece of display content may be an instruction trigger identifier. The instruction trigger identifier may be a color block, a symbol, text, etc. The specific forms and functions of the instruction trigger identifier will be further described in the following steps.

At step 102, the K pieces of display content may be displayed on the K display tiles in accordance with the display information.

Referring to step 101, in an aspect, the display information may indicate that a piece of display content is displayed on each of the display screens $A_5$ and $B_2$. At step 102, the display may be performed in accordance with the display information, i.e. an instruction trigger identifier may be displayed on each of the display screens $A_5$ and $B_2$.

Figure 2:
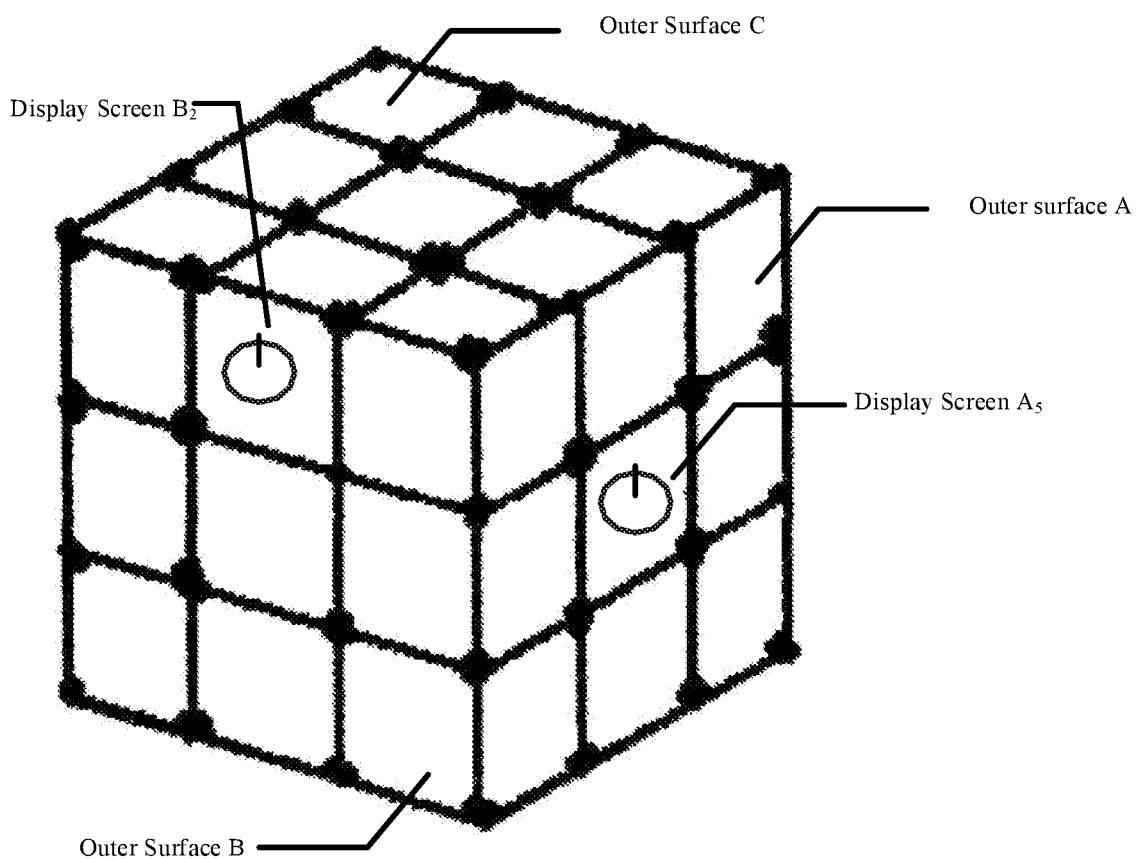
FIG. 2 is a schematic diagram for illustrating a position change of display content as illustrated according to an exemplary aspect of the present disclosure.

FIG. 2 shows a case in which the instruction trigger identifier is a Power-on/off symbol. FIG. 2 shows three outer surfaces of the smart cube, which are the outer surface A, the outer surface B and the outer surface C, respectively. The number of display tiles is 2. The display tiles includes the display screens $A_5$ and $B_2$, and other display screens may be left blank or display other display content than the instruction trigger identifier.

At step 103, updated information may be determined after the turning of the smart cube.

The updated information may be the display information updated in accordance with the turning of the smart cube. A user may change positions of the display content on the outer surfaces of the smart cube by turning the smart cube. The change of positions of the display content may be monitored by the smart cube.

In an aspect, each time the user turns the smart cube, the smart cube may execute the step 103 once.

Figure 3:
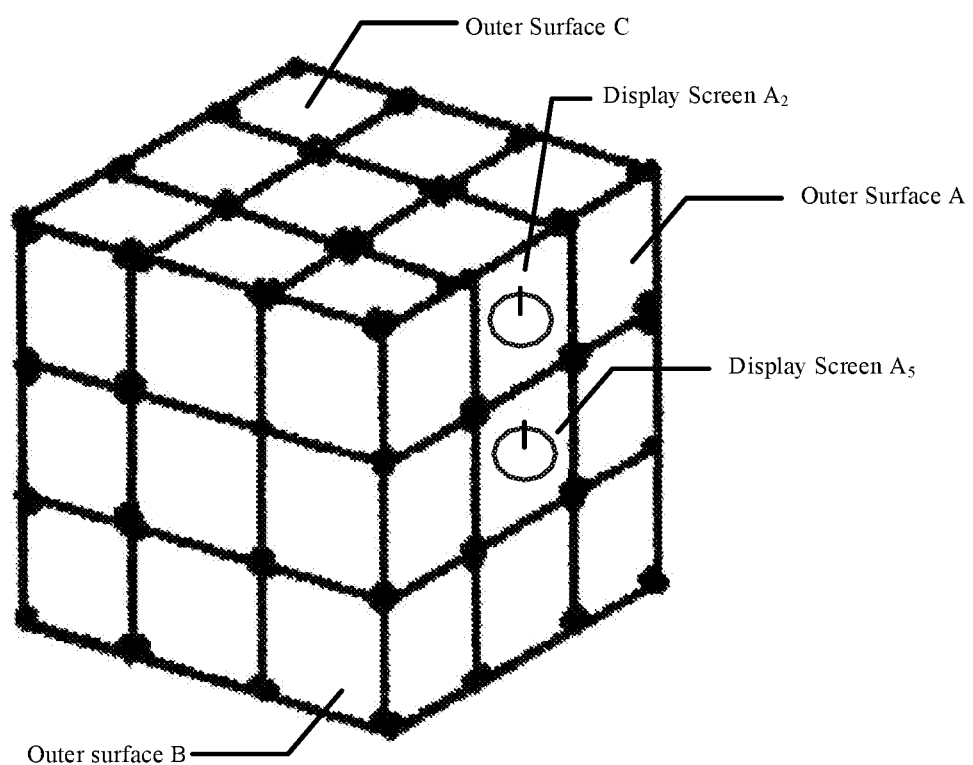
FIG. 3 is a schematic diagram for illustrating a position change of display content as illustrated according to an exemplary aspect of the present disclosure.

With reference to the form of the smart cube shown in FIG. 2, when the user turns the outer surface C along a counter clockwise direction, the display screen $B_2$ before the turning of the smart cube will become the display screen $A_2$ on the outer surface A after the turning of the smart cube. The form of the smart cube after turning is shown in FIG. 3.

Accordingly, before the turning of the smart cube, the display information indicates that an instruction trigger identifier is displayed on each of the display screens $A_5$ and $B_2$; after the turning of the smart cube, the updated information indicates that an instruction trigger identifier is displayed on each of the display screens $A_5$ and $A_2$.

In another aspect, each time the user triggers a submitting function, the smart cube may execute the step 103 once. The submitting function may be triggered when the user presses a button set on a certain cube block of the smart cube or when the user shakes the smart cube. The specific manners for the user to manually trigger the step 103 will not be limited in the present disclosure.

At step 104, a preset operation may be triggered when it is determined that the display content displayed on the outer surface of the smart cube satisfies a preset condition according to the updated information.

Since the pieces of display content are in one-to-one correspondence with the display tiles, the preset condition that the display content needs to satisfy may be described hereinafter by referring to the position relationship between the display tiles.

In an aspect, when the display tiles on any outer surface of the smart cube include L display tiles for displaying predetermined L pieces of display content, the preset operation may be triggered. Here, L≥2, and the L pieces of display content are included in the K pieces of display content.

With reference to the example of the 3×3 cube in the above described steps, the predetermined L pieces of display content may be two instruction trigger identifiers. When the user turns the smart cube to gather the display tiles showing the two instruction trigger identifiers to a same outer surface (the outer surface A), the preset operation may be triggered.

In a specific application scenario, triggering the preset operation means that the smart cube instructs a target device to execute a control operation bound to the two instruction trigger identifiers (the two power-on/off symbols). For instance, the target device is a smart curtain, and the control operation bound to the two instruction trigger identifiers is to turn the smart curtain on or off. When the user turns the cube to gather the two instruction trigger identifiers onto a same outer surface, the smart cube may send an on/off command to the smart curtain. The smart cube may be connected with the smart curtain through WIFI, Bluetooth, infrared or other ways. The smart curtain may open when it receives the command under a closed state, or may be closed when it receives the command under an opening state.

With the information processing method provided in the aspect of the present disclosure, the display content is displayed on the display screen of the outer wall of the smart cube, the user may change the position of the display content on the outer surface of the smart cube by turning the smart cube and a certain operation may be triggered when the display content satisfies a preset condition, thus enriching interactions between the user and products and improving user experience.

Figure 4:
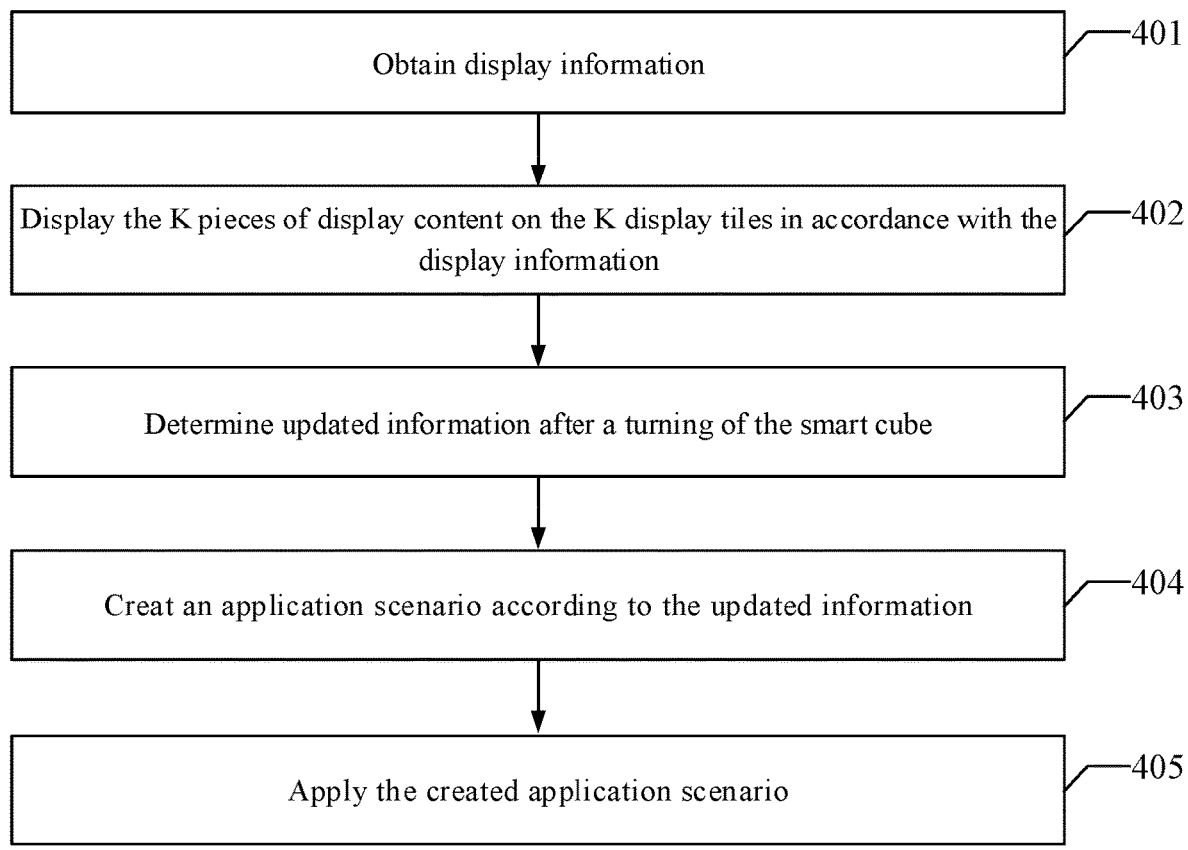
FIG. 4 is a flow chart of an information processing method as illustrated according to an exemplary aspect of the present disclosure.

Based on the information processing method provided in the aspect corresponding to the above FIGS. 1 to 3, FIG. 4 shows a flow chart of an information processing method as illustrated according to an exemplary aspect. The aspect as shown in FIG. 4 takes a case in which a user creates a customized application scenario for a target device as an example case to further illustrate the function of the smart cube, where the application scenario is used to indicate what kind of control operations will be performed when a certain condition is satisfied.

In the aspect as shown in FIG. 4, when a number of pieces of display content meeting a certain condition are gathered to any outer surface of the smart cube, the application scenario may be created. The contents of some of the steps are the same as or similar to the steps in the aspects corresponding to FIGS. 1 to 3, and only the differences of the steps are described in detail below. Referring to FIG. 4, the information processing method of the aspect may include steps 401 to 405.

At step 401, display information may be obtained.

In an aspect, when the user does not turn the smart cube for a period of time, the display screen of the outer surface of the smart cube may be turned off or display a screensaver. When the user presses a wake-up button or shakes the smart cube, the smart cube may wake up and obtain the display information.

The display information may be used to indicate positions of K display tiles and K pieces of display content corresponding to the K display tiles. The display information may be the display information of the last time the display screen was turned off, or may be the display information in an initial state at power on.

In an aspect, the K pieces of display content may include C candidate trigger conditions and M candidate control operations, where C+M=K. A trigger condition is a condition for instructing the target device to trigger a control operation. For example, an application scenario about a smart curtain is the smart curtain may be opened when someone is approaching the smart curtain after 6:00 am. Each of "After 6:00 am" and "Someone is approaching the smart curtain" is the trigger condition. When both of the trigger conditions are satisfied, the smart curtain may perform the control operation of "Open the smart curtain".

C+M is smaller than the total number of display screens on the smart cube. For example, assuming the smart cube is a 3×3 cube, the total number of display screens on the smart cube is 54. In an aspect, C=10, M=6, C+M=16<54. The display information may be used to indicate that 6 control operations and 10 trigger conditions are displayed on 16 display tiles as follows: a control operation is shown on each of the display screens A5, B5, C5, D5, E5 and F5, and a trigger condition is shown on each of the display screens A1, A2, B1, B2, C1, C2, D1, D2, E1 and E2.

At step 402, the K pieces of display content may be displayed on the K display tiles in accordance with the display information.

At step 403, updated information may be determined after the turning of the smart cube.

At step 404, the application scenario may be created according to the updated information.

When the display tiles on any outer surface of the smart cube include L display tiles for displaying predetermined L pieces of display content, the application scenario may be created. Here, the L pieces of display content are included in the K pieces of display content.

In an aspect, L=2, and the predetermined L pieces of display content consist of a trigger condition and a control operation. For example, the trigger condition is "6:00 am", the control operation is "Open the smart curtain", and then the application scenario as created according to the two pieces of display content may be "Open the smart curtain at 6:00 am".

When a trigger condition and a control operation appear on an outer surface, the trigger condition and the control operation may be saved for controlling the target device. That is, when the trigger condition is satisfied, the control operation may be performed. For example, the smart curtain may be opened at 6:00 am.

In an aspect, L>2, the predetermined L pieces of display content consist of a control operation and two or more coexisting trigger conditions.

Two trigger conditions can coexist means that the two conditions are not conflicting. For example, the two trigger conditions are non-contradictory events.

The two trigger conditions may be recorded as the trigger condition 1 and the trigger condition 2, and the control operation may be recorded as the control operation 1.

Assume the trigger condition 1 is "After 6:00 am", the trigger condition 2 is "Someone is approaching the smart curtain", and the control operation is "Open the smart curtain". Since "After 6:00 am" and "Someone is approaching the smart curtain" are non-contradictory events, the trigger condition 1 and the trigger condition 2 can coexist.

Assume the trigger condition 1 is "After 7:00 am", the trigger condition 2 is "Before 6:00 am", and the control operation is "Open the smart curtain". Since "After 7:00 am" and "Before 6:00 am" are contradictory events, the trigger condition 1 and the trigger condition 2 cannot coexist.

When two or more coexisting trigger conditions and a control operation appear on an outer surface, the two or more trigger conditions and the control operation may be saved for controlling the target device. That is, when the two or more trigger conditions are satisfied, the control operation may be performed. For example, the smart curtain may be opened when someone is approaching the smart curtain after 6:00 am.

At step 405, the created application scenario may be applied.

When a selected trigger condition is satisfied, the target device may be instructed to perform a selected control operation. Here, the selected trigger condition may be all of the trigger conditions corresponding to an application scenario, and the selected control operation may be a control operation corresponding to the application scenario.

For example, the application scenario as defined by the saved display content in the step 404 is "Open the smart curtain when someone is approaching the smart curtain after 6:00 am". In this case, when both of the trigger conditions "After 6:00 am" and "Someone is approaching the smart curtain" are satisfied, the smart curtain may be instructed to open.

With the information processing method provided in the aspect of the present disclosure, the display content is displayed on the display screen of the outer wall of the smart cube, the user may change the position of the display content on the outer surface of the smart cube by turning the smart cube and a customized application scenario may be saved for controlling the target device when the display content satisfies a preset condition, thus enriching interactions between the user and products and adding much fun to the process of the user performing customized operations.

Figure 5:
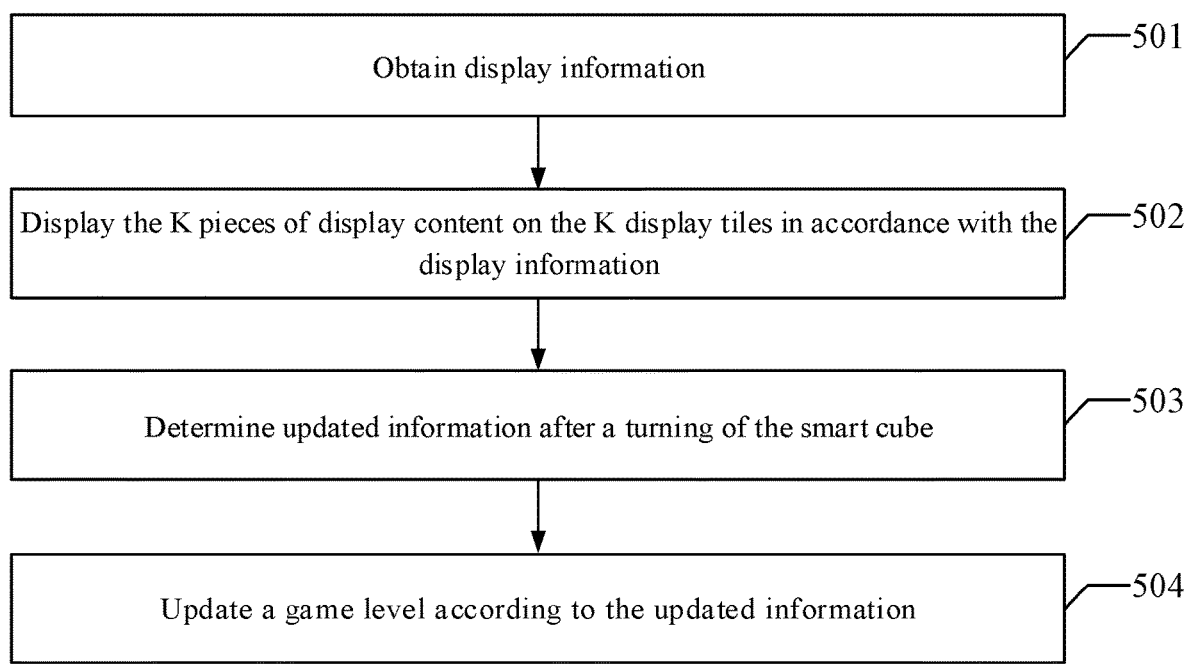
FIG. 5 is a flow chart of an information processing method as illustrated according to an exemplary aspect of the present disclosure.

Based on the information processing method provided in the aspect corresponding to the above FIGS. 1 to 4, FIG. 5 shows a flow chart of an information processing method as illustrated according to an exemplary aspect. The aspect as shown in FIG. 5 takes a case in which a user plays Scrabble or jigsaw puzzles using the smart cube as an example case to further illustrate the function of the smart cube.

In the aspect as shown in FIG. 5, when a number of pieces of display content meeting a certain condition are gathered to any outer surface of the smart cube and the number of pieces of display content are arranged in a predetermined order, a Scrabble or jigsaw puzzles level may be completed. The contents of some of the steps are the same as or similar to the steps in the aspects corresponding to FIGS. 1 to 4, and only the differences of the steps are described in detail below. Referring to FIG. 5, the information processing method of the aspect may include steps 501 to 504.

At step 501, display information may be obtained.

The display information may be used to indicate positions of K display tiles and K pieces of display content corresponding to the K display tiles.

In an aspect, the user may play jigsaw puzzles with the smart cube. The K pieces of display content may include L image tiles that can be arranged on at least one outer surface of the smart cube to form a complete image. L is smaller than or equal to the total number of the display screens on an outer surface.

In an application scenario, the smart cube may be connected to a smart phone. Before a jigsaw puzzles game starts or during the game, the user may instruct the smart cube to display the complete image through the smart phone, and then return to the current out-of-order state. Further, the user may also instruct the smart cube to display teaching tips through the smart phone, and then the user may turn the smart cube according to the teaching tips to restore the out-of-order image tiles into the complete image.

In an aspect, the user may play the scrabble game with the smart cube. In this case, the K pieces of display content may include L letters that can be arranged on at least one outer surface of the smart cube to form at least one word.

At step 502, the K pieces of display content may be displayed on the K display tiles in accordance with the display information.

At step 503, updated information may be determined after the turning of the smart cube.

At step 504, the game level may be updated according to the updated information.

When the display tiles on any outer surface of the smart cube include L display tiles for displaying predetermined L pieces of display content and the L display tiles are arranged in a predetermined order, the game level may be updated.

The predetermined L pieces of display content may be the L image tiles that can be arranged on an outer surface of the smart cube to form a complete image or the L letters that can be arranged on an outer surface of the smart cube to form at least one word.

The L display tiles are arranged in a predetermined order means that the L image tiles are arranged to form a complete image or the L letters are arranged to form at least one word.

For the jigsaw puzzles game, in an aspect, updating the game level means when the L image tiles are arranged to form a complete image, the method may jump to step 501 to obtain new display information and then the image tiles forming a complete image are arranged on an outer surface of the smart cube. The number and the complexity of the image tiles may be adapted in accordance with the difficulty of the game selected by the user.

For the Scrabble game, in an aspect, updating the game level means when the number of distinct words that the user makes by using the letters shown on the smart cube reaches a preset threshold, the method may jump to step 501 to obtain new display information and then the letters forming at least one word are arranged on at least one outer surface of the smart cube.

With the information processing method provided in the aspect of the present disclosure, the display content is displayed on the display screen of the outer wall of the smart cube, the user may play the Scrabble or jigsaw puzzles game with the smart cube, thus enriching interactions between the user and products and improving user experience.

Device aspects of the present disclosure that may be applied to implement the method aspects of the present disclosure are described as follows.

Figure 6:
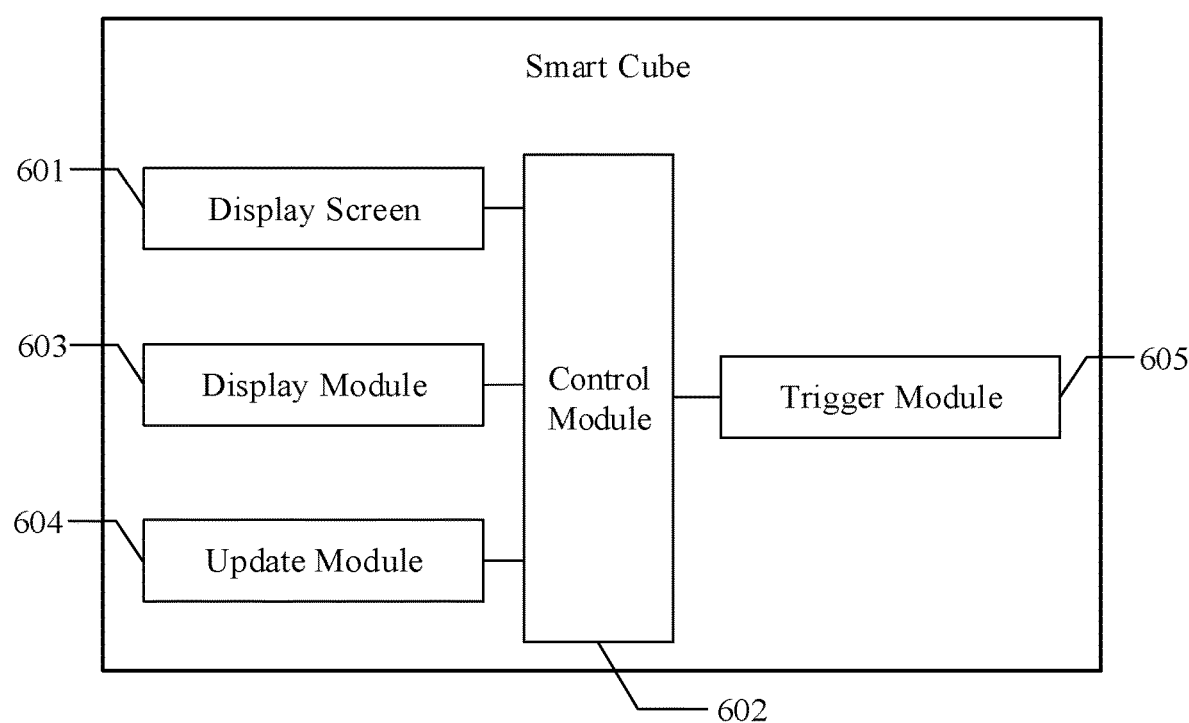
FIG. 6 is a block diagram of a smart cube as illustrated according to an exemplary aspect of the present disclosure.

FIG. 6 is a block diagram of a smart cube according to an exemplary aspect. The smart cube may realize part or all of its functions through software, hardware, or a combination thereof, and may be used to implement the information processing method as described in the aspects corresponding to FIGS. 1 to 5. As shown in FIG. 6, the smart cube includes a display screen 601 disposed on an outer wall of a cube block, and the smart cube also includes the following modules.

A control module 602 may be configured to obtain display information. The display information may be used to indicate positions of K display tiles and K pieces of display content corresponding to the K display tiles. A display tile may be a display screen 601 for displaying a piece of display content. K is smaller than the total number of display screens 601 on the smart cube.

A display module 603 may be configured to display the K pieces of display content on the K display tiles in accordance with the display information.

An update module 604 may be configured to determine updated information after the turning of the smart cube. The updated information may be the display information updated in accordance with the turning of the smart cube.

A trigger module 605 may be configured to trigger a preset operation when it is determined that the display content displayed on an outer surface of the smart cube satisfies a preset condition according to the updated information.

Figure 7:
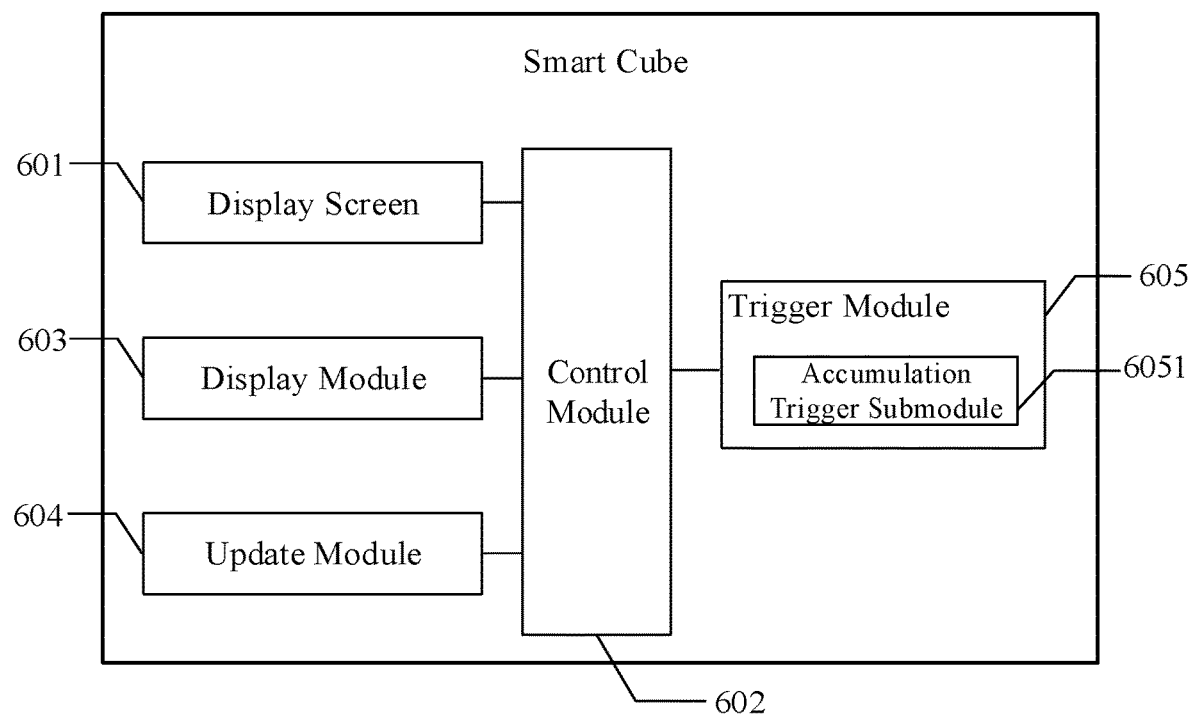
FIG. 7 is a block diagram of a smart cube as illustrated according to an exemplary aspect of the present disclosure.

As shown in FIG. 7, in an aspect, the trigger module 605 may include an accumulation trigger submodule 6051 that is configured to trigger the preset operation when the display tiles on any outer surface of the smart cube include L display tiles for displaying predetermined L pieces of display content.

Here, L≥2, and the L pieces of display content are included in the K pieces of display content.

In an aspect, the K pieces of display content may include L instruction trigger identifiers.

The L pieces of display content may be the L instruction trigger identifiers.

Figure 8:
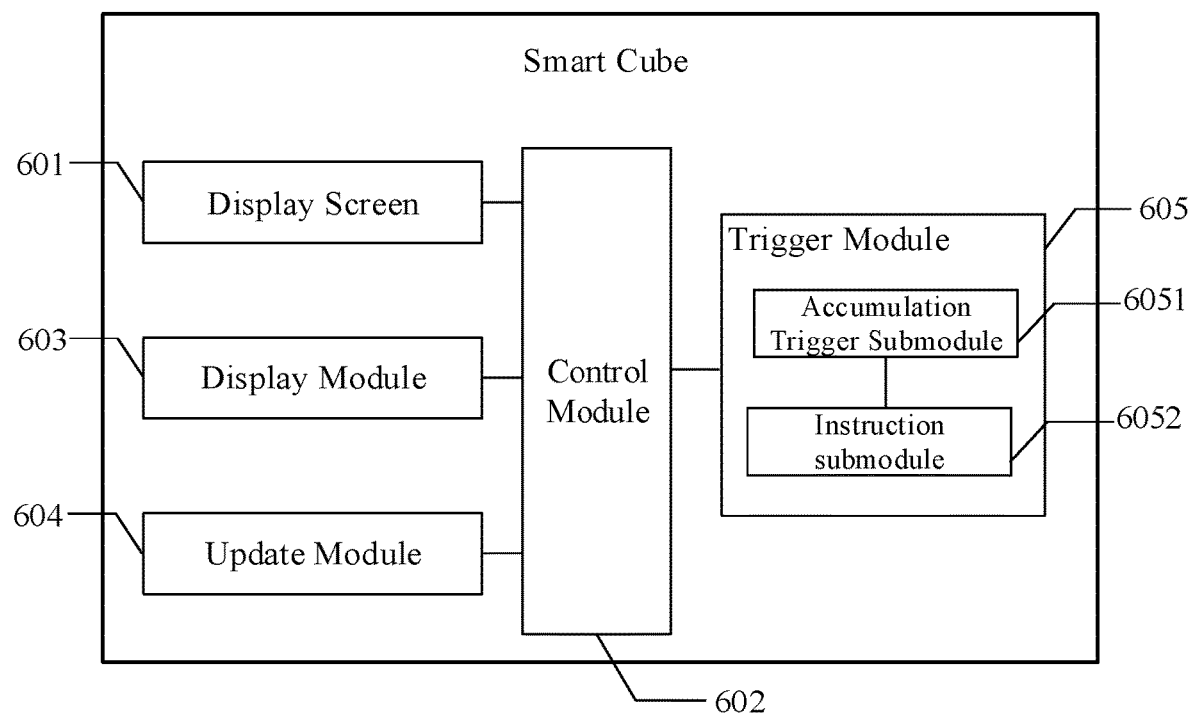
FIG. 8 is a block diagram of a smart cube as illustrated according to an exemplary aspect of the present disclosure.

As shown in FIG. 8, the trigger module 605 may include an instruction submodule 6052 for instructing a target device to perform a control operation bound to the L instruction trigger identifiers.

In an aspect, the K pieces of display content may include C candidate trigger conditions and M candidate control operations, and a trigger condition is a condition for instructing the target device to trigger a control operation, where C+M=K.

The L pieces of display content may include a trigger condition and a control operation. Alternatively, the L pieces of display content may include two or more coexisting trigger conditions and a control operation.

Figure 9:
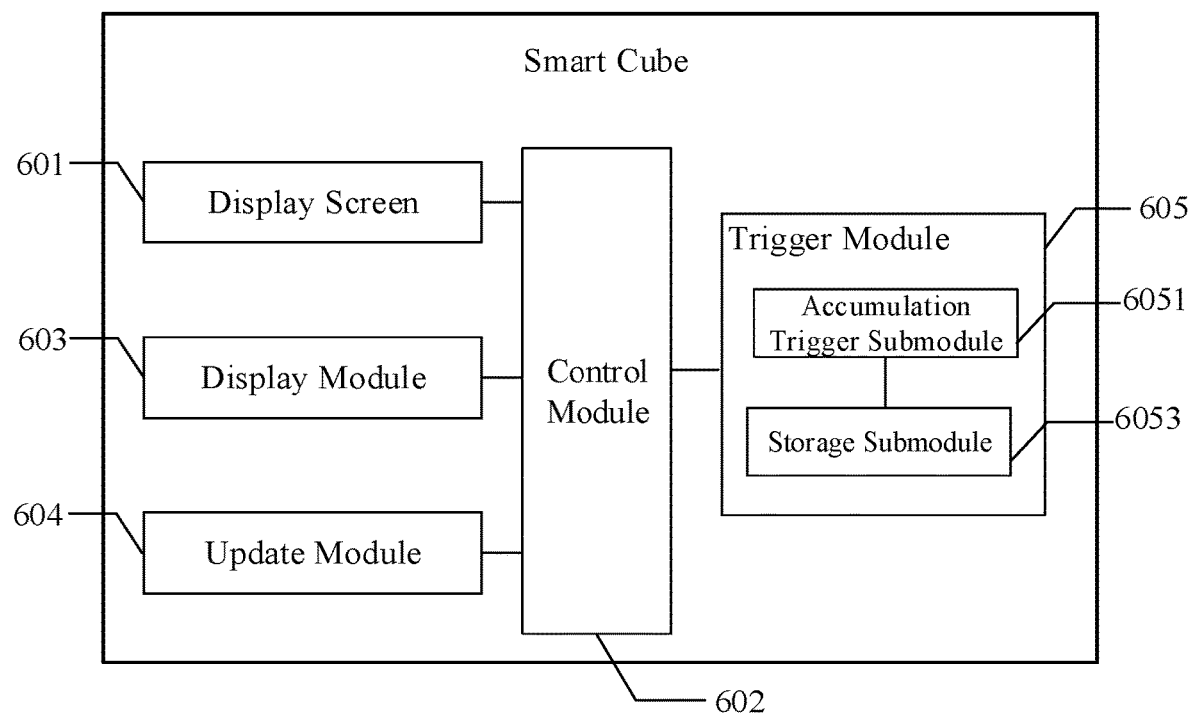
FIG. 9 is a block diagram of a smart cube as illustrated according to an exemplary aspect of the present disclosure.

As shown in FIG. 9, the trigger module 605 may include a storage submodule 6053 for storing the L pieces of display content to be applied to control the target device.

Figure 10:
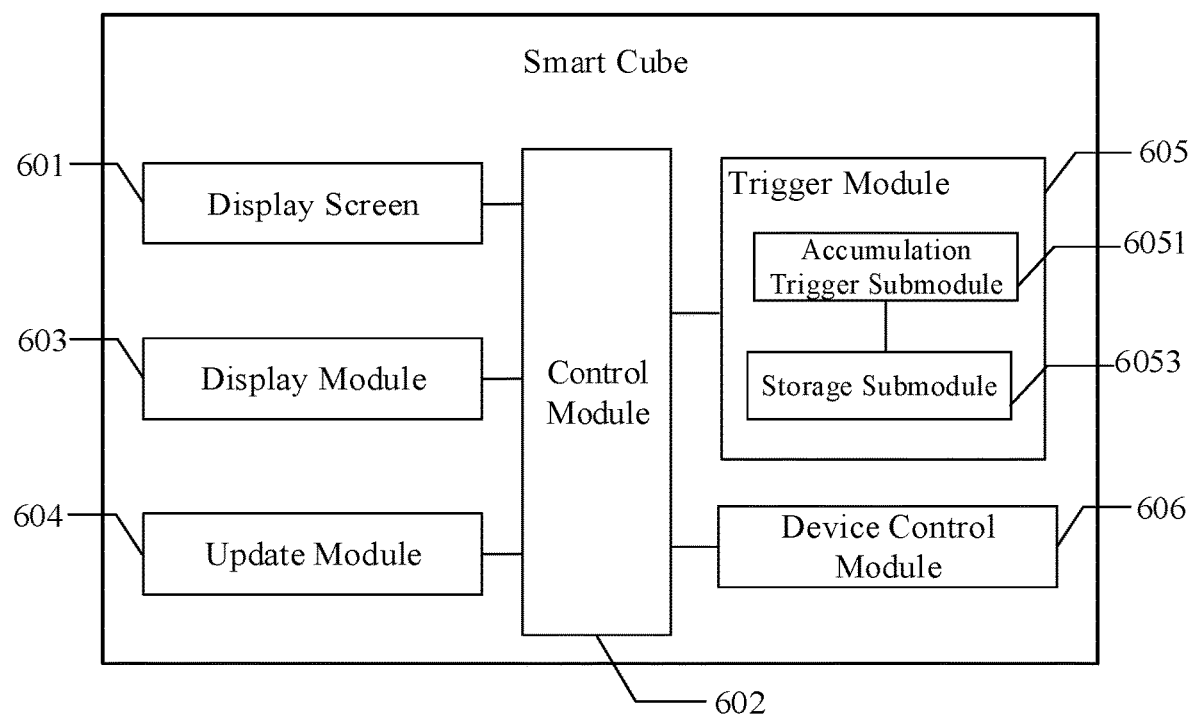
FIG. 10 is a block diagram of a smart cube as illustrated according to an exemplary aspect of the present disclosure.

As shown in FIG. 10, in an aspect, a device control module 606 may be also included to instruct the target device to perform a selected control operation when a selected trigger condition is satisfied.

Here, the selected trigger condition may be all of the trigger conditions included in the L pieces of display content, and the selected control operation may be a control operation included in the L pieces of display content.

Figure 11:
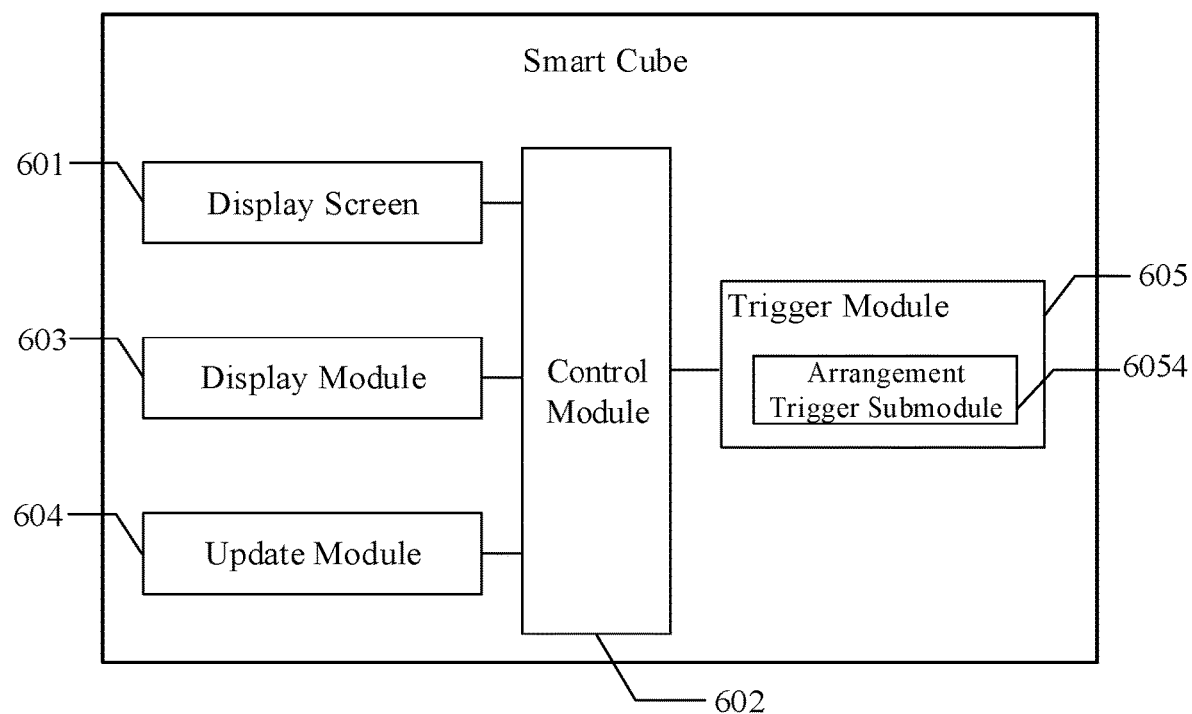
FIG. 11 is a block diagram of a smart cube as illustrated according to an exemplary aspect of the present disclosure.

As shown in FIG. 11, in an aspect, the trigger module 605 may include an arrangement trigger submodule 6054 that is configured to trigger the preset operation when the display tiles on any outer surface of the smart cube include L display tiles for displaying predetermined L pieces of display content and the L display tiles are arranged in a predetermined order.

Here, L≥2, and the L pieces of display content are included in the K pieces of display content.

In an aspect, the K pieces of display content may include L image tiles that can be arranged on an outer surface of the smart cube to form a complete image.

The L pieces of display content may be the L image tiles.

Figure 12:
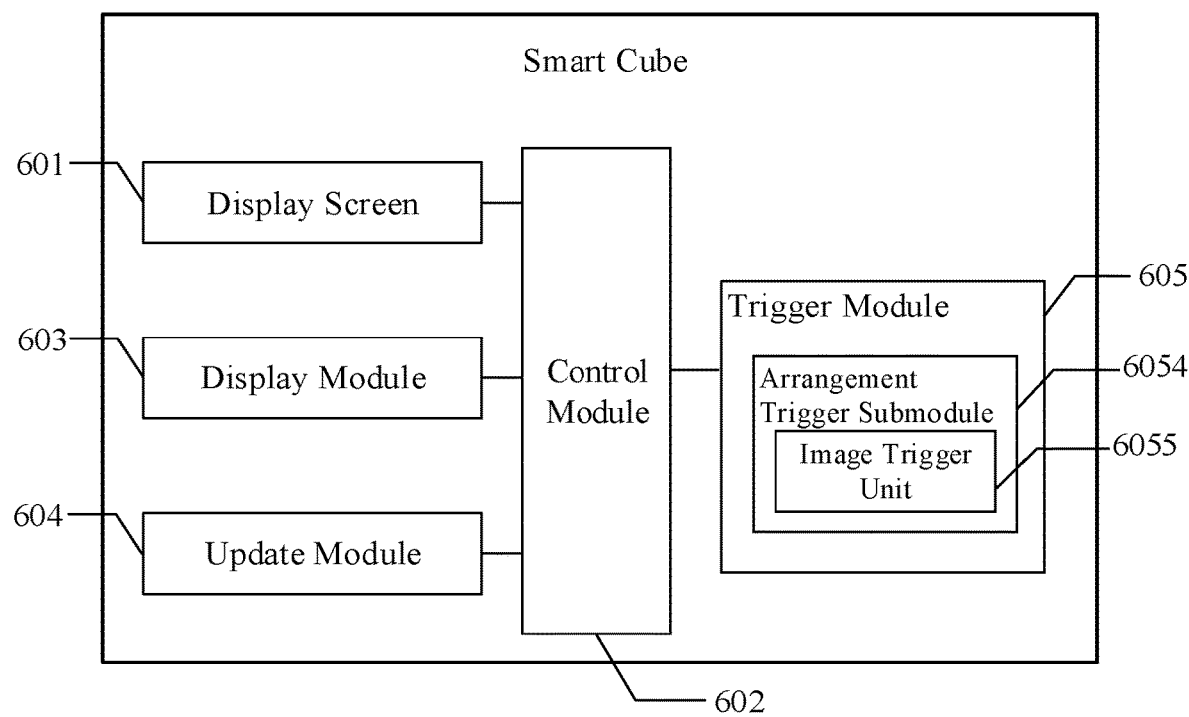
FIG. 12 is a block diagram of a smart cube as illustrated according to an exemplary aspect of the present disclosure.

As shown in FIG. 12, the arrangement trigger submodule 6054 may include an image trigger unit 6055 that is configured to trigger the preset operation when the L image tiles as displayed by the L display tiles are arranged to form a complete image.

In an aspect, the K pieces of display content may include L letters that can be arranged on an outer surface of the smart cube to form at least one word.

The L pieces of display content may be the L letters.

Figure 13:
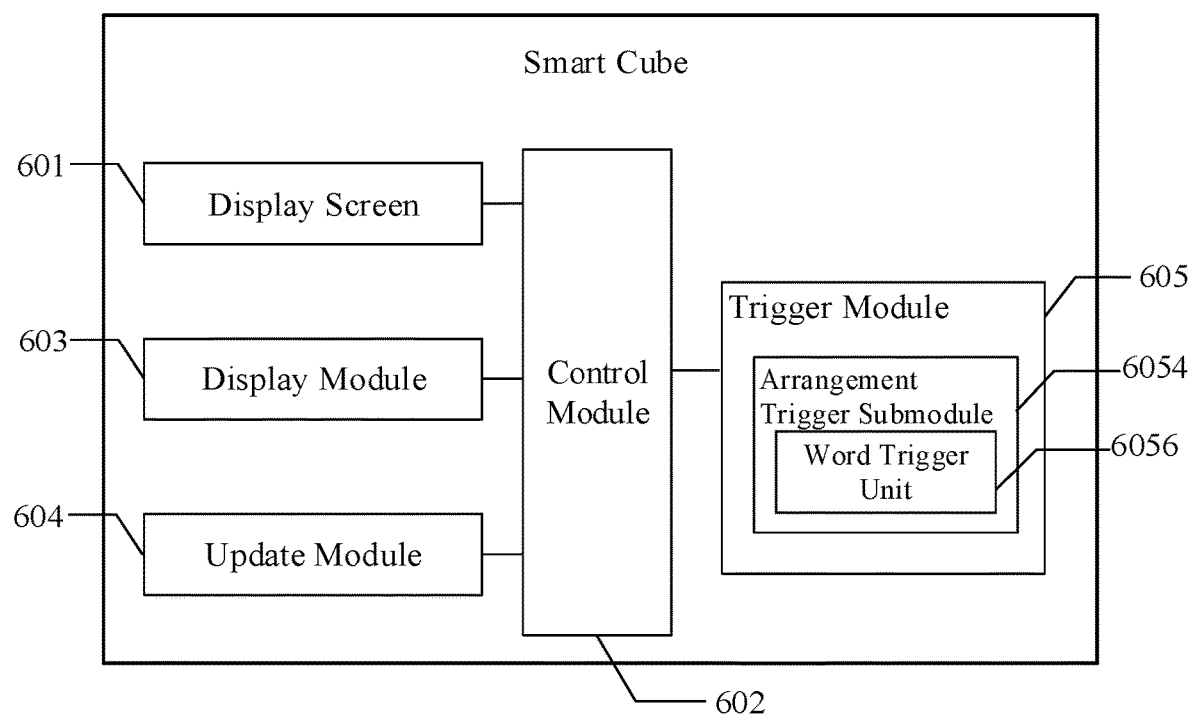
FIG. 13 is a block diagram of a smart cube as illustrated according to an exemplary aspect of the present disclosure.

As shown in FIG. 13, the arrangement trigger submodule 6054 may include a word trigger unit 6056 that is configured to trigger the preset operation when the L letters as displayed by the L display tiles are arranged to form at least one word.

Figure 14:
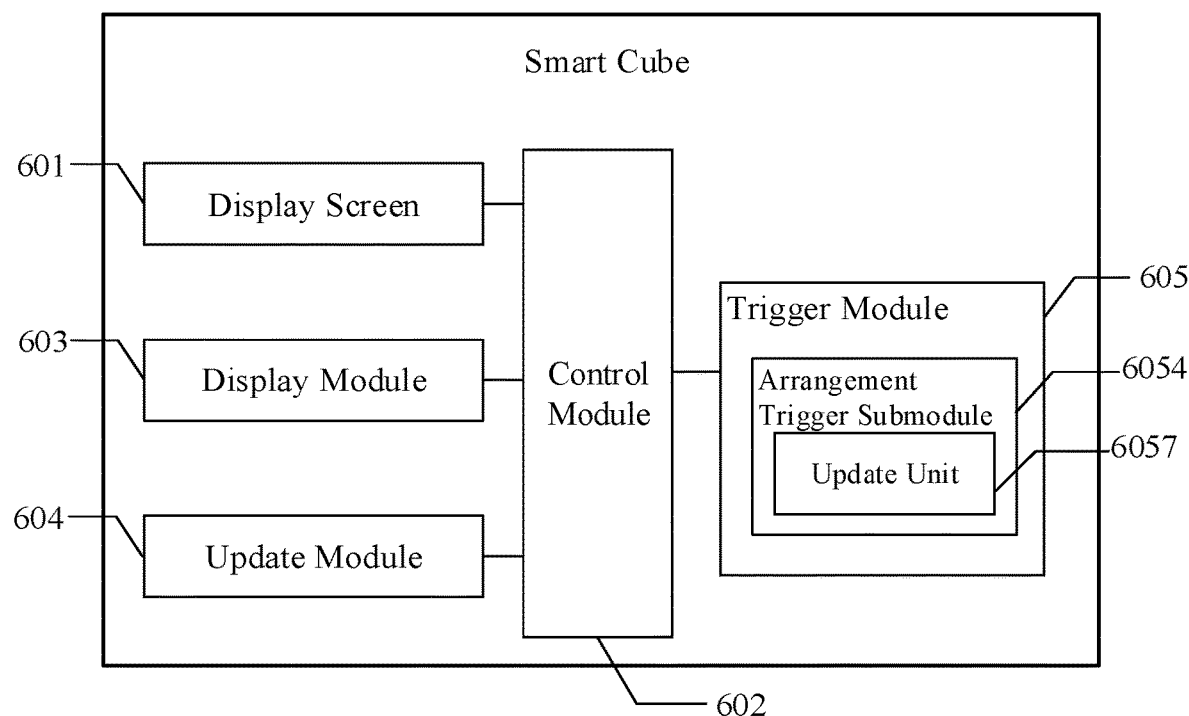
FIG. 14 is a block diagram of a smart cube as illustrated according to an exemplary aspect of the present disclosure.

As shown in FIG. 14, in an aspect, the arrangement trigger submodule 6054 may include a display update unit 6057 that is configured to obtain new display information and perform the display according to the new display information.

With the smart cube provided in the aspects of the present disclosure, the display content is displayed on the display screen of the outer wall of the smart cube, the user may change the position of the display content on the outer surface of the smart cube by turning the smart cube and a certain operation may be triggered when the display content satisfies a preset condition, thus enriching interactions between the user and products and improving user experience.

Figure 15:
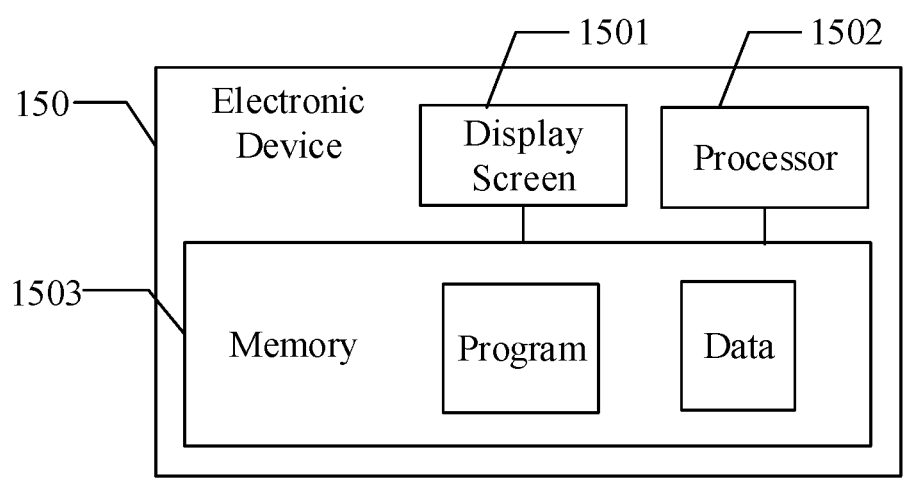
FIG. 15 is a block diagram of a smart cube as illustrated according to an exemplary aspect of the present disclosure.

FIG. 15 is a block diagram of a smart cube according to an exemplary aspect. The smart cube may realize part or all of its functions through software, hardware, or a combination thereof, and may be used to implement the information processing method as described in the aspects corresponding to FIGS. 1 to 5. As shown in FIG. 15, the smart cube 150 is provided with a display screen 1501 on an outer wall of a cube block. The smart cube 150 may include a processor 1502 and a memory for storing instructions executable by the processor 1502.

The processor 1502 may be configured to obtain display information, wherein the display information may be used to indicate positions of K display tiles and K pieces of display content corresponding to the K display tiles, a display tile may be a display screen for displaying a piece of display content, and K is smaller than the total number of display screens on the smart cube; display the K pieces of display content on the K display tiles in accordance with the display information; determine updated information after the turning of the smart cube, wherein the updated information may be the display information updated in accordance with the turning of the smart cube; and trigger a preset operation when it is determined that the display content displayed on an outer surface of the smart cube satisfies a preset condition according to the updated information.

In an aspect, the processor 1502 may be further configured so that the display tiles on any outer surface of the smart cube include L display tiles for displaying predetermined L pieces of display content, wherein L≥2 and the L pieces of display content are included in the K pieces of display content.

In an aspect, the processor 1502 may be further configured so that the K pieces of display content include L instruction trigger identifiers; the L pieces of display content are the L instruction trigger identifiers; and the trigger of a preset operation includes instructing a target device to perform a control operation bound to the L instruction trigger identifiers.

In an aspect, the processor 1502 may be further configured so that the K pieces of display content include C candidate trigger conditions and M candidate control operations, and a trigger condition is a condition for instructing a target device to trigger a control operation, where C+M=K; the L pieces of display content include a trigger condition and a control operation; or the L pieces of display content include two or more coexisting trigger conditions and a control operation; and the trigger of a preset operation includes storing the L pieces of display content to be applied to control the target device.

In an aspect, the processor 1502 may be further configured to instruct the target device to perform a selected control operation when a selected trigger condition is satisfied, wherein the selected trigger condition includes all of the trigger conditions included in the L pieces of display content, and the selected control operation is a control operation included in the L pieces of display content.

In an aspect, the processor 1502 may be further configured so that the L display tiles are arranged in a predetermined order.

In an aspect, the processor 1502 may be further configured so that the K pieces of display content include L image tiles that are arranged on an outer surface of the smart cube to form a complete image; the L pieces of display content are the L image tiles; and the L display tiles are arranged in a predetermined order includes the L image tiles as displayed by the L display tiles are arranged to form a complete image.

In an aspect, the processor 1502 may be further configured so that the K pieces of display content include L letters that are arranged on an outer surface of the smart cube to form at least one word; the L pieces of display content are the L letters; and the L display tiles are arranged in a predetermined order includes: the L letters as displayed by the L display tiles are arranged to form at least one word.

In an aspect, the processor 1502 may be further configured so that the trigger of a preset operation includes obtaining new display information, and performing the display in accordance with the new display information.

With the smart cube provided in the aspects of the present disclosure, the display content is displayed on the display screen of the outer wall of the smart cube, the user may change the position of the display content on the outer surface of the smart cube by turning the smart cube and a certain operation may be triggered when the display content satisfies a preset condition, thus enriching interactions between the user and products and improving user experience.

Figure 16:
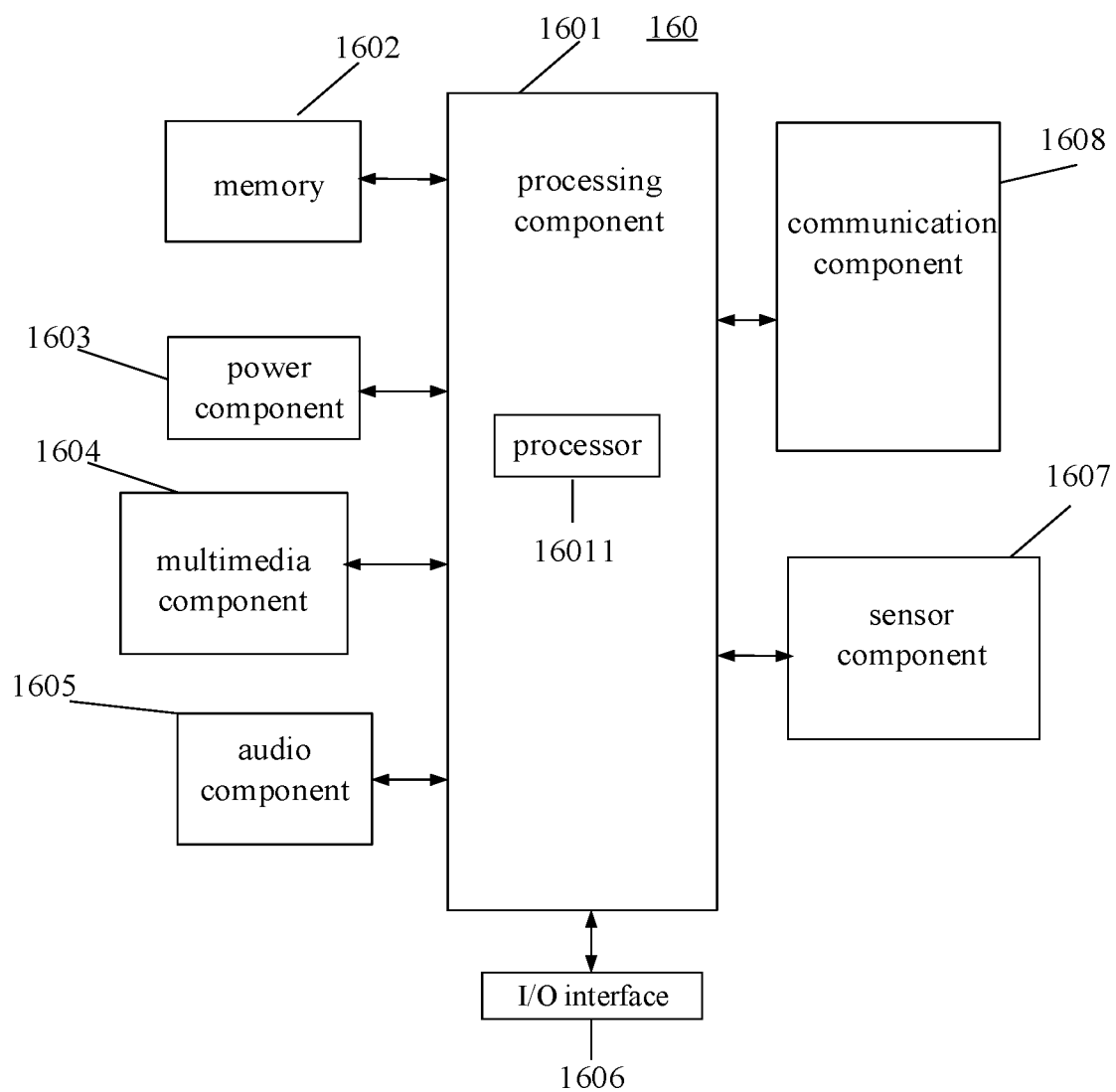
FIG. 16 is a block diagram illustrating an electronic device as illustrated according to an exemplary aspect of the present disclosure.

The smart cube provided in the aspects of the present disclosure may be an electronic device 160 as shown in FIG. 16. The product form of the electronic device may be a smart cube having a display screen disposed on an outer wall of a cube block of the smart cube. FIG. 16 is a block diagram of an electronic device according to an exemplary aspect. The electronic device may be used to implement the information processing method as described in the aspects corresponding to FIGS. 1 to 5.

The electronic device 160 may include one or more of the following components: a processing component 1601, a memory 1602, a power component 1603, a multimedia component 1604, an audio component 1605, an input/output (I/O) interface 1606, a sensor component 1607, and a communication component 1608.

The processing component 1601 typically controls overall operations of the electronic device 160. The processing component 1601 may include one or more processors 16011 to execute instructions to perform all or part of the steps in the above described methods. Moreover, the processing component 1601 may include one or more modules which facilitate the interaction between the processing component 1601 and other components. For instance, the processing component 1601 may include a multimedia module to facilitate the interaction between the multimedia component 1604 and the processing component 1601.

The memory 1602 is configured to store various types of data to support operations of the electronic device 160. Examples of such data may include instructions for any applications or methods operated on the electronic device 160. The memory 1602 may be implemented using any type of volatile or non-volatile storages, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 1603 provides power to various components of the electronic device 160. The power component 1603 may include a power management system, one or more power sources, and any other components associated with the generation, management, and distribution of power in the electronic device 160.

The multimedia component 1604 includes a screen providing an output interface between the electronic device 160 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also detect a period of time and a pressure associated with the touch or swipe action.

The audio component 1605 is configured to output and/or input audio signals. In some aspects, the audio component 1605 further includes a speaker to output audio signals.

The I/O interface 1606 provides an interface between the processing component 1601 and peripheral interface modules, such as a keyboard, a click wheel, buttons, and the like. The buttons may include, but are not limited to, a volume button, a starting button, and a locking button.

The sensor component 1607 includes one or more sensors to provide status assessments of various aspects of the electronic device 160. For instance, the sensor component 1607 may detect an open/closed status of the electronic device 160, relative positioning of components, e.g., the display and the keypad, of the electronic device 160, a change in position of the electronic device 160 or a component of the electronic device 160, a presence or absence of user contact with the electronic device 160, an orientation or an acceleration/deceleration of the electronic device 160, and a change in temperature of the electronic device 160. The sensor component 1607 may include a proximity sensor configured to detect the presence of nearby objects without any physical contact. The sensor component 1607 may also include a light sensor, such as a Complementary Metal Oxide Semiconductor (CMOS) or Charge-coupled Device (CCD) image sensor, for use in imaging applications. In some aspects, the sensor component 1607 may also include an accelerometer sensor, a gyroscope sensor, a magnetic sensor, a pressure sensor, or a temperature sensor.

The communication component 1608 is configured to facilitate communication, wired or wirelessly, between the electronic device 160 and other devices. The electronic device 160 can access a wireless network based on a communication standard, such as WiFi, 2G, or 3G, or a combination thereof. In an exemplary aspect, the communication component 1608 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary aspects, the electronic device 160 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing an information processing method as described in the above aspects corresponding to FIGS. 1-5.

In exemplary aspects, there is also provided a non-transitory computer readable storage medium including instructions, such as the memory 1602 including instructions executable by the processing component 1601 in the electronic device 160 to perform the above-described methods. For example, the non-transitory computer readable storage medium may be a Random Only Memory (ROM), a Random Access Memory (RAM), a Compact Disc Read-Only Memory (CD-ROM), a magnetic tape, a floppy disc, an optical data storage device, and the like. The instructions in the storage medium, when executed by the processing component 1601 in the electronic device 160, enable the electronic device 160 to perform an information processing method as described in the above aspects corresponding to FIGS. 1-5. The method may include a smart cube obtaining display information, wherein the smart cube is provided with a display screen on an outer wall of a cube block of the smart cube, the display information is used to indicate positions of K display tiles and K pieces of display content corresponding to the K display tiles, a display tile is a display screen for displaying a piece of display content, and K is smaller than a total number of display screens on the smart cube; displaying the K pieces of display content on the K display tiles in accordance with the display information; determining updated information after a turning of the smart cube, wherein the updated information is the display information updated in accordance with the turning of the smart cube; and triggering a preset operation when it is determined that the display content displayed on an outer surface of the smart cube satisfies a preset condition according to the updated information.

In an aspect, the method may include the display tiles on any outer surface of the smart cube include L display tiles for displaying predetermined L pieces of display content, wherein L≥2 and the L pieces of display content are included in the K pieces of display content.

In an aspect, the method may include the K pieces of display content include L instruction trigger identifiers; the L pieces of display content are the L instruction trigger identifiers; and the triggering a preset operation includes instructing a target device to perform a control operation bound to the L instruction trigger identifiers.

In an aspect, the method may include the K pieces of display content include C candidate trigger conditions and M candidate control operations, and a trigger condition is a condition for instructing a target device to trigger a control operation, where C+M=K; the L pieces of display content include a trigger condition and a control operation; or the L pieces of display content include two or more coexisting trigger conditions and a control operation; and the triggering a preset operation includes storing the L pieces of display content to be applied to control the target device.

In an aspect, the method may include instructing the target device to perform a selected control operation when a selected trigger condition is satisfied, wherein the selected trigger condition includes all of the trigger conditions included in the L pieces of display content, and the selected control operation is a control operation included in the L pieces of display content.

In an aspect, the method may include the L display tiles are arranged in a predetermined order.

In an aspect, the method may include the K pieces of display content include L image tiles that are arranged on an outer surface of the smart cube to form a complete image; the L pieces of display content are the L image tiles; and the L display tiles are arranged in a predetermined order includes the L image tiles as displayed by the L display tiles are arranged to form a complete image.

In an aspect, the method may include the K pieces of display content include L letters that are arranged on an outer surface of the smart cube to form at least one word; the L pieces of display content are the L letters; and the L display tiles are arranged in a predetermined order includes: the L letters as displayed by the L display tiles are arranged to form at least one word.

In an aspect, the method may include the triggering a preset operation includes obtaining new display information, and performing the display in accordance with the new display information.

With the electronic device and the storage medium provided in the aspects of the present disclosure, the display content is displayed on the display screen of the outer wall of the smart cube, the user may change the position of the display content on the outer surface of the smart cube by turning the smart cube and a certain operation may be triggered when the display content satisfies a preset condition, thus enriching interactions between the user and products and improving user experience.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following general principles thereof and including such departures from the present disclosure as come within known or customary practice in the art. The specification and aspects are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. An information processing method, comprising:

obtaining display information via a smart cube, wherein the smart cube includes a cube block having a plurality of outer surfaces each having at least one of a plurality of display screens, each one of the plurality of display screens is configured to display a piece of display content, the display information is configured to indicate positions of K display tiles and K pieces of display content corresponding to the K display tiles, each one of the K display tiles corresponds to one of the plurality of display screens, and K is smaller than a total number of the display screens on the smart cube, where K is an integer number larger than zero;

displaying the K pieces of the display content on the K display tiles based on the display information;

detecting a turning of the smart cube;

determining updated information based on the turning of the smart cube, wherein the updated information is the display information updated based on the turning of the smart cube;

determining whether the display content displayed on at least one of the outer surfaces of the smart cube satisfies a preset condition based on the updated information; and triggering a preset operation when it is determined that the display content displayed on at least one of the outer surfaces of the smart cube satisfies the preset condition based on the updated information, wherein the display content displayed on the outer surface of the smart cube satisfies the preset condition when the display tiles on any one of the outer surfaces of the smart cube comprise L display tiles for displaying predetermined L pieces of the display content, wherein L is an integer number larger than or equal to 2 and the L pieces of the display content are included in the K pieces of the display content; the K pieces of the display content comprise C candidate trigger conditions and M candidate control operations, and at least one of the C candidate trigger conditions is configured to instruct a target device to trigger at least one of the M candidate control operations, where C is an integer number larger than zero, M is an integer number larger than zero, and C+M=K; and the L pieces of display content comprise a trigger condition and a control operation; or the L pieces of display content comprise two or more coexisting trigger conditions and the control operation; and wherein triggering the preset operation comprises:
storing the L pieces of the display content to be applied to control the target device; and
instructing the target device to perform a selected control operation when a selected trigger condition is satisfied, wherein the selected trigger condition comprises all of the trigger conditions included in the L pieces of the display content, and the selected control operation is the control operation included in the L pieces of the display content.

2. The information processing method of claim 1, wherein:
the K pieces of the display content comprise L instruction trigger identifiers;
the L pieces of the display content are the L instruction trigger identifiers; and
the triggering a preset operation comprises instructing a target device to perform a control operation bound to the L instruction trigger identifiers.

3. The information processing method of claim 1, wherein the display content displayed on the outer surface of the smart cube satisfies the preset condition further when the L display tiles are arranged in a predetermined order.

4. The information processing method of claim 3, wherein:
the K pieces of the display content comprise L image tiles that are arranged on one of the outer surfaces of the smart cube to form a complete image;
the L pieces of the display content are the L image tiles; and
the L display tiles are arranged in the predetermined order when the L image tiles as displayed by the L display tiles are arranged to form the complete image.

5. The information processing method of claim 3, wherein:
the K pieces of the display content comprise L letters that are arranged on one of the outer surfaces of the smart cube to form at least one word;
the L pieces of the display content are the L letters; and
the L display tiles are arranged in the predetermined order when the L letters as displayed by the L display tiles are arranged to form the at least one word.

6. The information processing method of claim 3, wherein triggering the preset operation comprises obtaining new display information, and generating a display based on the new display information.

7. A non-transitory computer-readable storage medium having computer instructions stored thereon, wherein the instructions, when executed by a processor, cause the processor to implement the information processing method of claim 1.

8. A smart cube, comprising:
a cube block having a plurality of outer surfaces each having at least one of a plurality of display screens, wherein each one of the plurality of display screens is configured to display a piece of display content;
a control module configured to obtain display information, wherein the display information is used to indicate positions of K display tiles and K pieces of display content corresponding to the K display tiles, each one of the K display tiles corresponds to one of the plurality of the display screens, and K is smaller than a total number of the display screens on the smart cube, where K is an integer number larger than zero;
a display module configured to display the K pieces of the display content on the K display tiles based on the display information;
a detector configured to detect a turning of the smart cube;
an update module configured to determine updated information based on the turning of the smart cube, wherein the updated information is the display information updated based on the turning of the smart cube;
a determiner configured to determine whether the display content displayed on at least one of the outer surfaces of the smart cube satisfies a preset condition based on the updated information; and
a trigger module configured to trigger a preset operation when it is determined that the display content displayed on at least one of the outer surfaces of the smart cube satisfies the preset condition based on the updated information, wherein the trigger module comprises:
an accumulation trigger submodule configured to trigger the preset operation when the display tiles on any one of the outer surfaces of the smart cube comprise L display tiles for displaying predetermined L pieces of the display content,
wherein, L is an integer number larger than or equal to 2 and the L pieces of the display content are included in the K pieces of the display content,
wherein:
the K pieces of the display content comprise C candidate trigger conditions and M candidate control operations, and at least one of the C candidate trigger conditions is configured to instruct a target device to trigger at least one of the M candidate control operations, where C is an integer number larger than zero, M is an integer number larger than zero, and C+M=K;
the L pieces of display content comprise a trigger condition and a control operation; or the L pieces of display content comprise two or more coexisting trigger conditions and the control operation; and
the trigger module further comprises a storage submodule configured to store the L pieces of the display content to be applied to control the target device and a device control module configured to instruct the target device to perform a selected control operation when a selected trigger condition is satisfied, wherein the selected trigger condition comprises all of the trigger conditions included in the L pieces of the display content, and the selected control operation is the control operation included in the L pieces of the display content.

9. The smart cube of claim 8, wherein:
the K pieces of the display content comprise L instruction trigger identifiers;
the L pieces of the display content are the L instruction trigger identifiers; and
the trigger module further comprises an instruction submodule configured to instruct a target device to perform a control operation bound to the L instruction trigger identifiers.

10. The smart cube of claim 8, wherein the trigger module comprises:
an arrangement trigger submodule configured to trigger the preset operation when the display tiles on any one of the outer surfaces of the smart cube comprise L display tiles for displaying predetermined L pieces of the display content and the L display tiles are arranged in a predetermined order.

11. The smart cube of claim 10, wherein:
the K pieces of the display content comprise L image tiles that are arranged on one of the outer surfaces of the smart cube to form a complete image;
the L pieces of the display content are the L image tiles; and
the arrangement trigger submodule comprises an image trigger configured to trigger the preset operation when the L image tiles as displayed by the L display tiles are arranged to form the complete image.

12. The smart cube of claim 10, wherein:
the K pieces of the display content comprise L letters that are arranged on one of the outer surfaces of the smart cube to form at least one word;
the L pieces of the display content are the L letters; and
the arrangement trigger submodule comprises a word trigger configured to trigger the preset operation when the L letters as displayed by the L display tiles are arranged to form the at least one word.

13. The smart cube of claim 10, wherein:
the arrangement trigger submodule comprises a display updater configured to obtain new display information and generate a display based on the new display information.

14. A smart cube, comprising:
a processor; and
a memory for storing instructions executable by the processor,
wherein the processor is configured to:
obtain display information, wherein the smart cube includes a cube block having a plurality of outer surfaces each having at least one of a plurality of display screens, each one of the plurality of display screens is configured to display a piece of display content, the display information is configured to indicate positions of K display tiles and K pieces of display content corresponding to the K display tiles, each one of the K display tiles corresponds to one of the plurality of display screens, and K is smaller than a total number of the display screens on the smart cube, where K is an integer number larger than zero;
display the K pieces of the display content on the K display tiles based on the display information;
detect a turning of the smart cube;
determine updated information based on the turning of the smart cube, wherein the updated information is the display information updated based on the turning of the smart cube;
determine whether the display content displayed on at least one of the outer surfaces of the smart cube satisfies a preset condition based on the updated information; and
trigger a preset operation when it is determined that the display content displayed on at least one of the outer surfaces of the smart cube satisfies the preset condition based on the updated information,
wherein the display content displayed on the outer surface of the smart cube satisfies the preset condition when the display tiles on any one of the outer surfaces of the smart cube comprise L display tiles for displaying predetermined L pieces of the display content, wherein L is an integer number larger than or equal to 2 and the L pieces of the display content are included in the K pieces of the display content; the K pieces of the display content comprise C candidate trigger conditions and M candidate control operations, and at least one of the C candidate trigger conditions is configured to instruct a target device to trigger at least one of the M candidate control operations, where C is an integer number larger than zero, M is an integer number larger than zero, and C+M=K; and the L pieces of display content comprise a trigger condition and a control operation; or the L pieces of display content comprise two or more coexisting trigger conditions and the control operation; and
wherein the processor is configured to trigger the preset operation by:
storing the L pieces of the display content to be applied to control the target device; and
instructing the target device to perform a selected control operation when a selected trigger condition is satisfied, wherein the selected trigger condition comprises all of the trigger conditions included in the L pieces of the display content, and the selected control operation is the control operation included in the L pieces of the display content.

* * * * *